US012625726B2

(12) United States Patent
Featherstone

(10) Patent No.: US 12,625,726 B2
(45) Date of Patent: May 12, 2026

(54) METHOD AND APPARATUS FOR IMPROVING A MULTI-ACCESS EDGE COMPUTING (MEC) NETWORK

(71) Applicant: Samsung Electronics Co., Ltd., Gyeonggi-do (KR)

(72) Inventor: Walter Featherstone, Middlesex (GB)

(73) Assignee: Samsung Electronics Co., Ltd (KR)

( * ) Notice: Subject to any disclaimer, the term of this patent is extended or adjusted under 35 U.S.C. 154(b) by 425 days.

(21) Appl. No.: 17/797,019

(22) PCT Filed: Feb. 3, 2021

(86) PCT No.: PCT/KR2021/001428

§ 371 (c)(1),
(2) Date: Aug. 2, 2022

(87) PCT Pub. No.: WO2021/158018

PCT Pub. Date: Aug. 12, 2021

(65) Prior Publication Data

US 2023/0075258 A1 Mar. 9, 2023

(30) Foreign Application Priority Data

Feb. 3, 2020 (GB) .................................... 2001451

(51) Int. Cl.
*G06F 9/46* (2006.01)
*G06F 9/48* (2006.01)
*G06F 9/50* (2006.01)

(52) U.S. Cl.
CPC ............ *G06F 9/485* (2013.01); *G06F 9/5072* (2013.01); *G06F 2209/503* (2013.01)

(58) Field of Classification Search
CPC ... G06F 9/485; G06F 9/5072; G06F 2209/503
See application file for complete search history.

(56) References Cited

U.S. PATENT DOCUMENTS

2013/0067089 A1* 3/2013 Synytskyy .............. G06F 9/485
709/226
2014/0040906 A1 2/2014 Kahn et al.
(Continued)

FOREIGN PATENT DOCUMENTS

CN 109358967 A * 2/2019 ........... G06F 9/5072
KR 10-2019-0099148 8/2019
(Continued)

OTHER PUBLICATIONS

PCT/ISA/210 Search Report issued on PCT/KR2021/001428, May 18, 2021 pp. 3.
(Continued)

*Primary Examiner* — Diem K Cao
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of operating a MEC system, comprising the step of instantiating a first application in the MEC system, which comprises the step of a first entity transmitting an application instantiation request to a second entity, wherein the application instantiation request comprises pre-emption information concerning the first application, such that the pre-emption information may be used to pre-empt the first application in the future, if required.

14 Claims, 8 Drawing Sheets

(56) References Cited

U.S. PATENT DOCUMENTS

| | | | |
|---|---|---|---|
| 2017/0357531 A1* | 12/2017 | Zhang | G06F 9/5016 |
| 2019/0042300 A1* | 2/2019 | Rigolet | G06F 9/485 |
| 2019/0104030 A1 | 4/2019 | Giust et al. | |
| 2020/0008044 A1 | 1/2020 | Poorachandran et al. | |
| 2020/0192711 A1* | 6/2020 | Zhang | G06F 9/5005 |
| 2020/0389531 A1 | 12/2020 | Lee et al. | |

FOREIGN PATENT DOCUMENTS

| | | |
|---|---|---|
| KR | 10-2020-0007754 | 1/2020 |
| WO | WO 2018/149263 | 8/2018 |
| WO | WO 2021/158018 | 8/2021 |

OTHER PUBLICATIONS

PCT/ISA/237 Written Opinion issued on PCT/KR2021/001428, May 18, 2021, pp. 4.

ETSI Draft; Europan Elecommunications Standards Institute, vol. WG NFV IFA, 2018, Huawei Tech Gmbh, "FEAT05 IFAOI0: Use case: Resolving a conflict by pre-empting running instance", p. 2-p. 5, Nov. 30, 2018 (5 pp).

ETSI Draft Specification European Telecommunications Standards Institute, vol. ISG MEC, 2019, "Multi-access Edge Computing (MEC); MEC Management; Part 2: Application lifecycle, rules and requirements management", Nov. 2019 134 pp).

* cited by examiner

METHOD AND APPARATUS FOR IMPROVING A MULTI-ACCESS EDGE COMPUTING (MEC) NETWORK

PRIORITY

This application is a National Phase Entry of PCT International Application No. PCT/KR2021/001428, which was filed on Feb. 3, 2021, and claims priority to United Kingdom Patent Application No. 2001451.0, which was filed on Feb. 3, 2020, the entire content of each of which is incorporated herein by reference.

TECHNICAL FIELD

The present invention relates to multi-access edge computing (MEC).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beam-forming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Co-ordinated Multi-Points (CoMP), reception-end interference cancellation and the like. In the 5G system, Hybrid FSK and QAM Modulation (FQAM) and sliding window su-perposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

The constraints exist since it is impractical, from a cost perspective, to dimension MEC hosts with sufficient resources to run all possible applications all of the time, especially as the number of available applications is only likely to increase over time. The result is that the finite resource available in practice should be carefully managed, since additional capacity cannot be brought into service without physically deploying more computing resource (i.e. server hardware) at the network edge. Therefore, it is preferable that application instances are only located where necessary, since each instance consumes valuable resource.

Embodiments of the present invention aim to address shortcomings in the prior art.

Solution to Problem

In one embodiment, a method performed by a first entity in a multi-access edge computing (MEC) system, the method comprising: transmitting, to a second entity, an application instantiation request message, wherein the application instantiation request message includes pre-emption information associated with a first application, and wherein the pre-emption information is used to pre-empt of the first application.

In another embodiment, a method performed by a second entity in a multi-access edge computing (MEC) system, the method comprising: receiving, from a first entity, a first application instantiation request message; deciding to pre-empt the first application, in case that the first application instantiation request message is associated with a second application and insufficient resources are available in the MEC system, or in case that a presence of an application conflict is existed; and, transmitting, to a target host, a second application instantiation request message; wherein the presence of the application conflict is associated with running the first application and the second application concurrently.

In another embodiment, a method performed by a target host in a multi-access edge computing (MEC) system, the method comprising: receiving, from a second entity, an application instantiation request message; and identifying a presence of an application conflict, wherein the presence of the application conflict is associated with running a first application and a second application concurrently.

In another embodiment, a first entity in a multi-access edge computing (MEC) system, the first entity comprising: a transceiver; and a controller configured to: transmit, to a second entity via the transceiver, an application instantiation request message, wherein the application instantiation request message, wherein the application instantiation request message includes pre-emption information associated with a first application, and wherein the pre-emption information is used to pre-empt of the first application.

In another embodiment, a second entity in a multi-access edge computing (MEC) system, the second entity comprising: a transceiver; and a controller configured to: receive, from a first entity via the transceiver, a first application instantiation request message; decide to pre-empt the first application, in case that the first application instantiation request message is associated with a second application and insufficient resources are available in the MEC system, or in case that a presence of an application conflict is existed; and, transmit, to a target host via the transceiver, a second application instantiation request message; wherein the presence of the application conflict is associated with running the first application and the second application concurrently.

In another embodiment, a target host in a multi-access edge computing (MEC) system, the target host comprising: a transceiver; and a controller configured to: receive, from a second entity via the transceiver, an application instantiation request message; and identify a presence of an application conflict, wherein the presence of the application conflict is associated with running a first application and a second application concurrently.

Advantageous Effects of Invention

Embodiments of the invention address the problem of how to ensure the desired applications are made available to subscribers at a particular MEC host location according to an operator's policies when the target edge application hosting environment is resource (CPU, memory, storage, etc.) constrained. Specifically, a mechanism is defined to provide the orchestrator of an MEC system with information to select whether and which existing application instances should be pre-empted in order to fulfil a new application instantiation request. In the context of this application, pre-emption is the act of either: removing an application from a particular MEC host to free up resources, particularly memory, for the instantiation of the pre-empting application; or changing the operational state of an application to free up resources, particularly processor capacity/time. An application for which its operational state is change may or may not have its operational state reverted in due course; and an application which is removed, may or may not be replaced in due course.

BRIEF DESCRIPTION OF DRAWINGS

For a better understanding of the invention, and to show how embodiments of the same may be carried into effect, reference will now be made, by way of example only, to the accompanying diagrammatic drawings in which.

MODE FOR THE INVENTION

MEC systems are known in the art and are typically provided to offer consumers an improved performance by physically locating certain resources at the edge of the network i.e. remote from the central core or internet, but close to the consumer.

Figure 1:
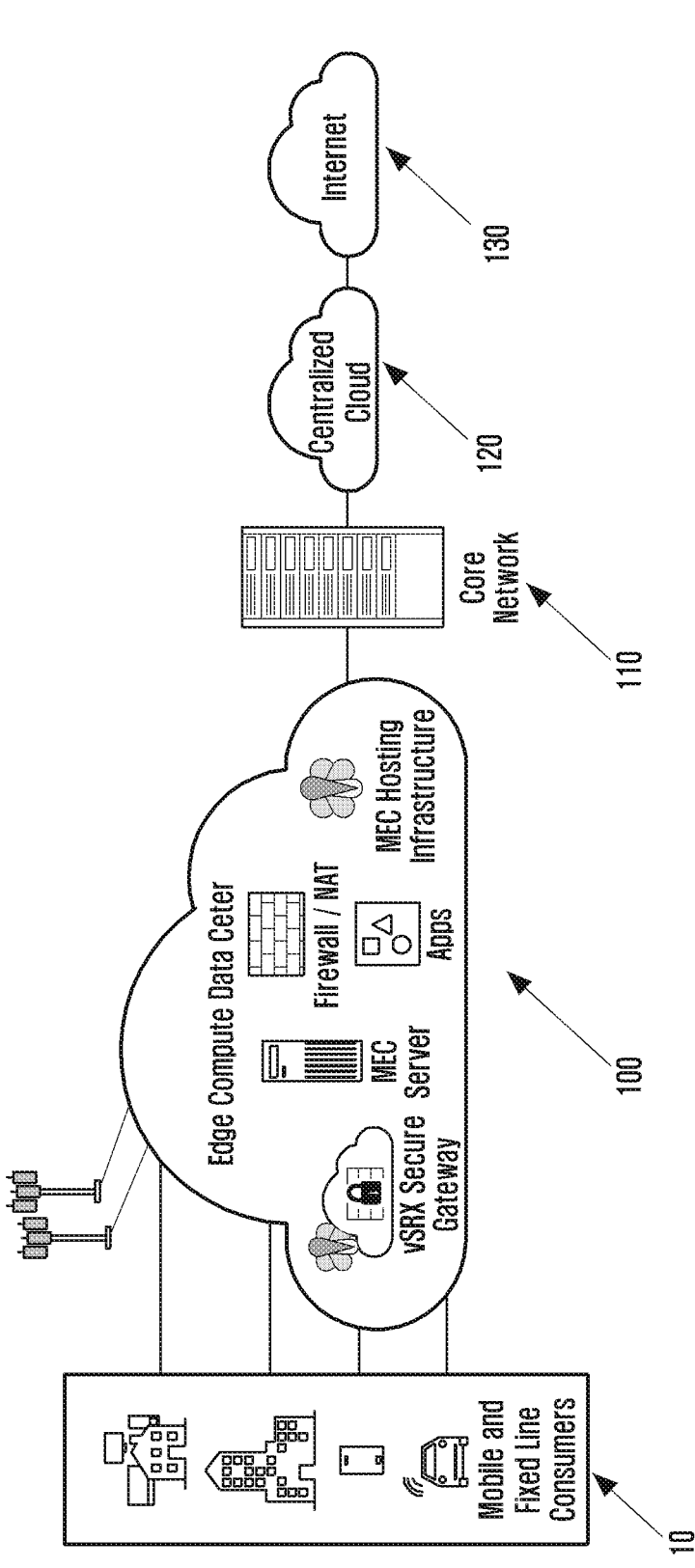
FIG. 1 illustrates a general view of a MEC network.

FIG. 1 shows a typical MEC system 100 and how it relates to other entities in the system. A plurality of user types 10 are able to connect to the MEC system 100. Such users 10 can access the MEC system 100 via fixed wire schemes, WiFi or cellular technologies, such as LTE or 5G, for instance.

The MEC system 100 comprises various further entities, including locally hosted applications (apps) and if the user 10 requests access to such an app, then the MEC system 100 is able to provide access to the user without recourse to any remote server or resource.

Such remote resources may, if needed, be accessed via core network 110 which is able to utilize resources in a centralized cloud 120 and/or the internet 130.

MEC systems 100 are necessarily localized and the availability of a particular resource to a user depends where that user is located and to which MEC system it has access.

ETSI have defined a set of specifications to facilitate the creation of an IT service environment at the edge of the network. A particular specification relevant to this invention is MEC-010-2 "Multi-access Edge Computing (MEC); MEC Management; Part 2: Application Lifecycle, Rules and Requirements Management"

Figure 2:
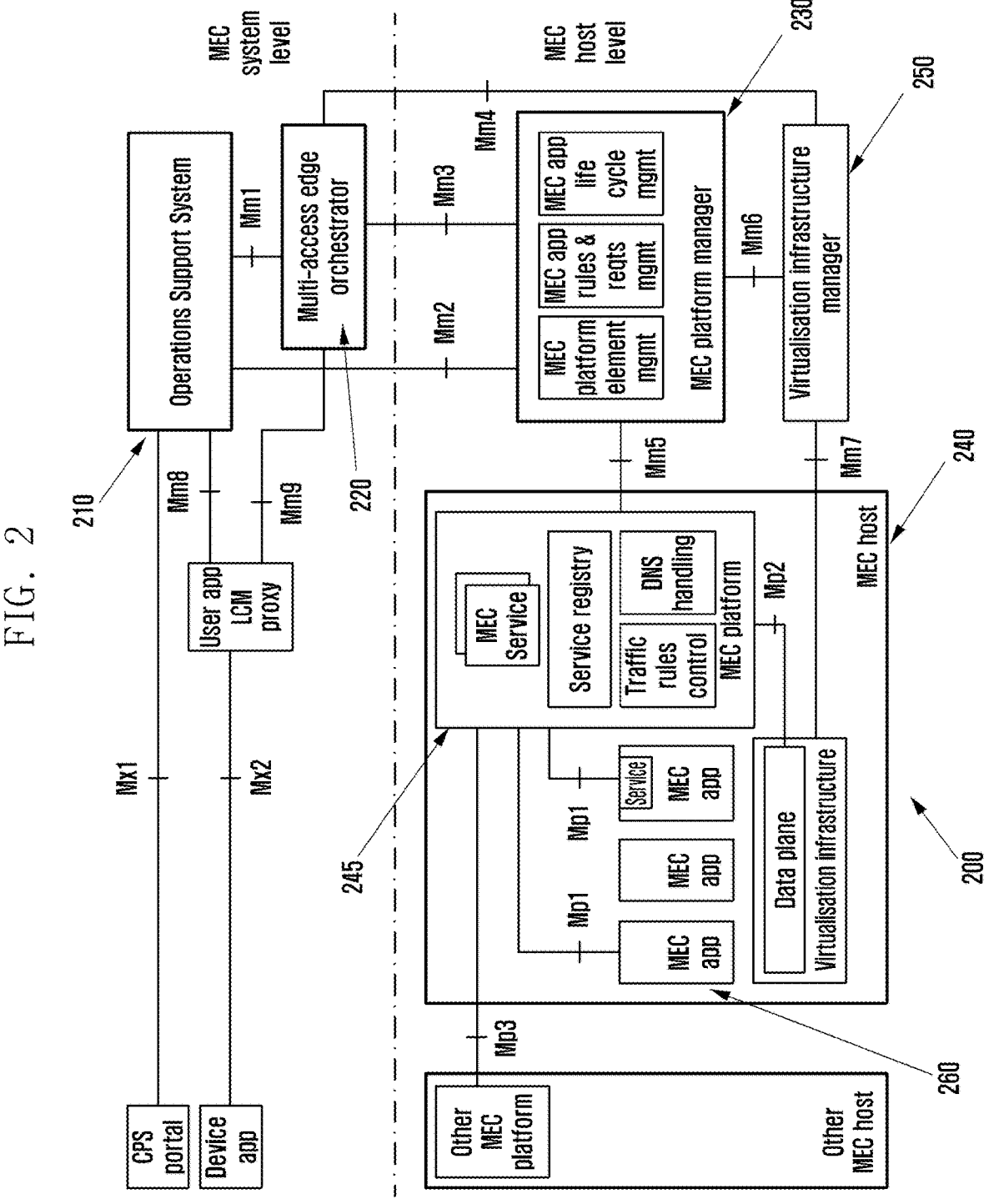
FIG. 2 illustrates a MEC System reference architecture.

The MEC-010-2 group specification defines application programming interfaces (APIs) for application lifecycle, rules and requirements management over Mm1 and Mm3 reference points. In the MEC architecture 200, shown in FIG. 2, the Mm1 reference point is between the operational support systems (OSS) 210 and the MEC Orchestrator 220. The Mm3 reference point is between the MEC orchestrator (MEO) 220 and the MEC platform manager (MEPM) 230. The APIs defined for these reference points provide procedures to onboard MEC application packages and then trigger instantiation of on boarded applications into the MEC system. The application instances of instantiated applications may be terminated or have their operational state change. Termination removes the application instance whereas the operational state of an application may be reverted without the need for re-instantiation. The MEC system currently supports "started" and "stopped" operational states. The application package contains of a set of files (detailed in the associated manifest file), provided by the application provider, necessary for application instantiation. Within the package, information is provided that describes the application. This includes its requirements (e.g. CPU, memory, storage, key performance indicators (KPIs)), release date, vendor information, provided services and required & optional services. The package also includes a software image (e.g. virtual machine (VM) image) of the application, or a uniform resource identifier (URI) to a software image.

The OSS 210 provides the high-level decision to onboard applications and then which of those applications are to be instantiated. However, it is the MEO 220 that is responsible for ensuring application instances are available at appropriate locations, as required. Within the MEC system there may be multiple MEC host locations, each with the capability of hosting MEC application instances. Therefore, in response to an application instantiation request from the OSS 210 sent via the Mm1 reference point, the MEO 220 must select the appropriate MEC host, or hosts, to instantiate instances of the application. This decision may be based on constraints such as MEC host offered latency, location, available resources and available services.

In order to make this decision, the MEO 220 is therefore expected to maintain an overall view of the MEC system based on deployed MEC hosts, available resources, available MEC services and topology, all of which may be variable in nature.

The constraints exist since it is impractical, from a cost perspective, to dimension MEC hosts with sufficient resources to run all possible applications all of the time, especially as the number of available applications is only likely to increase over time.

The result is that the finite resource available in practice should be carefully managed, since additional capacity cannot be brought into service without physically deploying more computing resource (i.e. server hardware) at the network edge. Therefore, it is preferable that application instances are only located where necessary, since each instance consumes valuable resource.

Embodiments of the present invention aim to address shortcomings in the prior art.

According to the present invention there is provided an apparatus and method as set forth in the appended claims. Other features of the invention will be apparent from the dependent claims, and the description which follows.

Embodiments of the invention address the problem of how to ensure the desired applications are made available to subscribers at a particular MEC host location according to an operator's policies when the target edge application hosting environment is resource (CPU, memory, storage, etc.) constrained. Specifically, a mechanism is defined to provide the orchestrator of an MEC system with information to select whether and which existing application instances should be pre-empted in order to fulfil a new application instantiation request. In the context of this application, pre-emption is the act of either: removing an application from a particular MEC host to free up resources, particularly memory, for the instantiation of the pre-empting application; or changing the operational state of an application to free up resources, particularly processor capacity/time. An application for which its operational state is change may or may not have its operational state reverted in due course; and an application which is removed, may or may not be replaced in due course.

In the following description, the primary focus is on the removal of an application, since this poses slightly more problems than changing the operational state of an application. However, the term pre-emption is herein used to cover both operations and will be understood accordingly by those skilled in the art.

Such decisions are made in the event that there are insufficient resources within the edge host environment to perform the instantiation. An update mechanism is also provided in case the resource availability at a host location changes.

The mechanism provides the flexibility to identify specific applications or groups of applications that are either candidates for pre-emption or protected from pre-emption with each new application instantiation request. This allows for complex business arrangements to be accounted for, which is particularly important in a MEC system where application providers, the edge service provider and the communications provider could all be separate independent entities and the relationship between them may be dynamic in nature where, for instance, it may be critical that certain applications or services are available at specific times. Without such information there may be inconsistent behavior across the overall network, since there may be multiple orchestrators.

Although a few preferred embodiments of the present invention have been shown and described, it will be appreciated by those skilled in the art that various changes and modifications might be made without departing from the scope of the invention, as defined in the appended claims.

According to a first aspect of the present invention, there is provided a method of operating a MEC system, comprising the step of instantiating a first application in the MEC system, which comprises the step of a first entity transmitting an application instantiation request to a second entity, wherein the application instantiation request comprises pre-emption information concerning the first application, such that the pre-emption information may be used to pre-empt the first application in the future, if required.

In an embodiment, the first entity is an operational support system, OSS, and the second entity is a MEC orchestrator, MEO.

In an embodiment, wherein the pre-emption of the first application comprises either a change in an operational state of the first application or the removal of the first application.

In an embodiment, the second entity decides to pre-empt the first application in the event that a request to instantiate a second application is received from the first entity and insufficient resources are available in the MEC system, or if a conflict prohibits the first and second application running concurrently.

In an embodiment, in response to receipt of an application instantiation request to instantiate a second application, a target host is identified within the MEC system, and the presence of an application conflict at the target host is assessed, such that if the assessment reveals an application conflict, a further assessment is made as whether the application conflict would be resolved if the first application is pre-empted.

In an embodiment, if the further assessment reveals that the application conflict would be resolved if the first application is pre-empted, then the first application is pre-empted.

In an embodiment, in response to receipt of an application instantiation request to instantiate a second application, a target host is identified within the MEC system and resource availability at the target host is assessed, such that if there is insufficient resource availability at the target host, an assessment is made as to whether sufficient resource could be available if the first application is pre-empted.

In an embodiment, if sufficient resource could be available if the first application is pre-empted, further comprising the step of pre-empting the first application.

In an embodiment, there is further provided a step of instantiating the second application.

In an embodiment, if sufficient resource could not be available if the first application is pre-empted, further comprising the step of not instantiating the second application.

In an embodiment, the target host is re-assessed to determine if sufficient resource is available.

In an embodiment, the application instantiation request has an associated expiry time, such that if the application instantiation request is not initially fulfilled, it may be re-assessed provided that the expiry time has not elapsed.

In an embodiment, in the event of more than one unfulfilled application instantiation requests, any such requests are ranked in a priority order, and the highest ranked is satisfied before any others.

According to a second aspect of the present invention, there is provided a MEC system operable to perform the method of the first aspect.

In an embodiment of the invention, information exchanged over the Mm1 reference point is augmented to allow the OSS to provide addition guidance to the MEO regarding application lifecycle management (LCM), specifically regarding pre-emption of existing application instances in order to fulfil new instantiation requests. Embodiments of the invention allow application instances to be prioritised based on an the operator's preferences, for instance according to any business relationship the operator has with an application provider, or based on ensuring certain application-provided services are available and therefore protected. Such preferences may be changed over time in a dynamic manner and therefore it is advantageous for the guidance to be provided with each instantiation request.

It should be noted that the edge service provider (ESP) may not be the wireless communications service provider, e.g. the public land mobile network operator (MNO). Typically, the MNO is responsible for the OSS 210, whilst the ESP would be responsible for the MEO 220. There are also scenarios where the MNO is responsible for providing the MEC hosting environment(s) (where application instances are hosted) and associated management and orchestration entities, whilst allowing interactions from a third-party OSS. Therefore, it is advantageous to enable the OSS to provide application LCM guidance to the MEO in a standardized manner, as provided by embodiments of the present invention.

Figure 3:
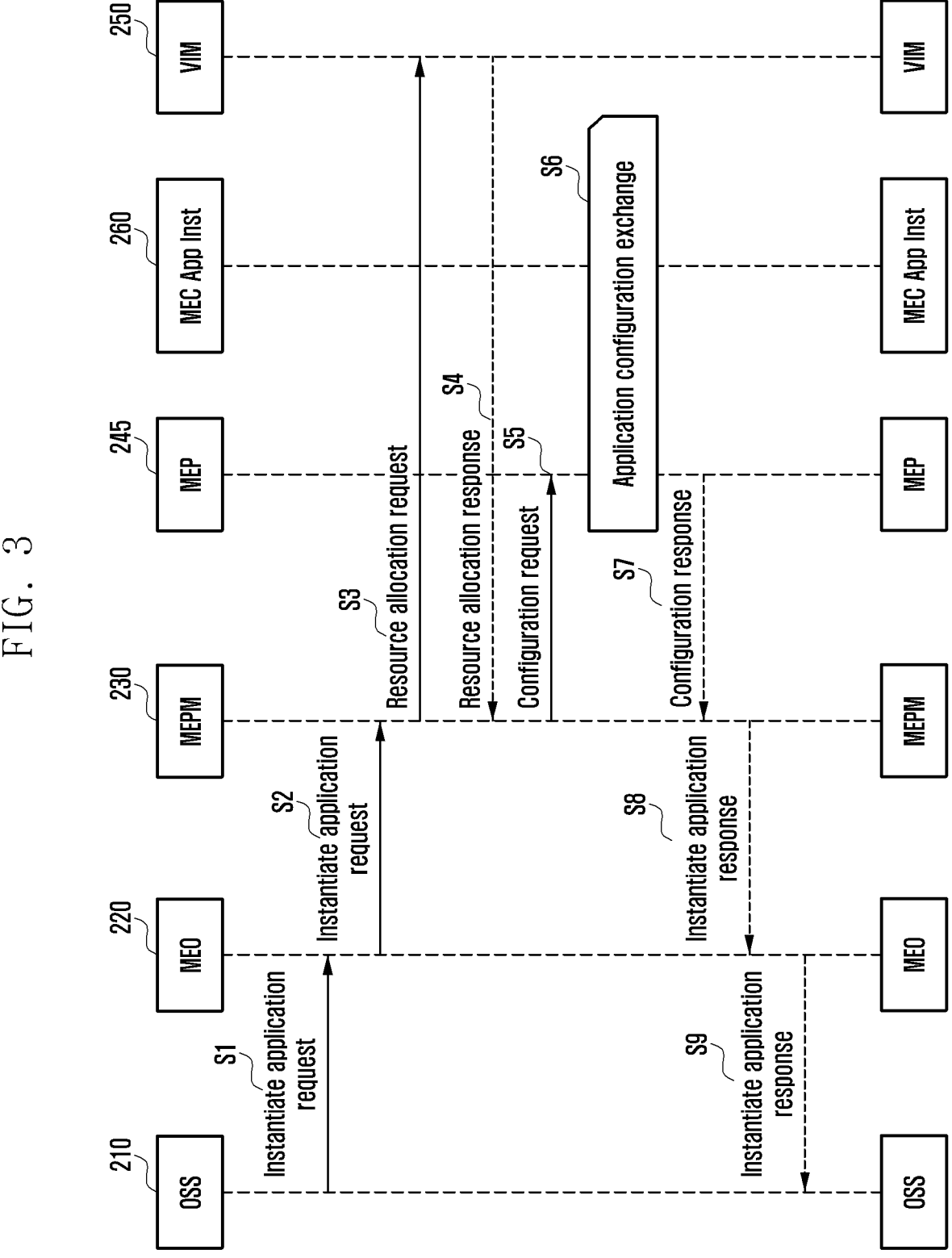
FIG. 3 illustrates an application instantiation flow according to an embodiment of the invention.

The prior art application instantiation flow is depicted in FIG. 3. The flow highlights that application instantiation requests are sent from the OSS 210 to the MEO 220, which then selects the MEC platform managers (MEPMs) 230 to instantiate application instances at their associated MEC hosts 240. Specifically the MEPM 230 transmits a resource allocation request to the virtualization infrastructure manager (VIM) 250, with the requested resource including compute, storage, and network resources. Application image information (e.g. a link to the image or an ID of the application image) is also included in the request. The VIM 250 allocates the resources according to the request and then loads the virtual machine with the application image and runs the VM and the application instance. If the operations are successfully executed the VIM 250 transmits a resource allocation response to the MEPM 230. The MEPM 230 also transmits a configuration request for the application to the MEC platform (MEP) 245, including aspects such as the traffic rules to be configured, DNS rules to be configured, the required and optional services, and services produced by the application instance.

Specifically, the flow is as follows:

S1: OSS 210 transmits instantiate application request to MEO 220.

S2: MEO transmits instantiate application request to MEPM 230.

S3: MEPM transmits resource allocation request to VIM 250.

S4: VIM responds to MEPM with resource allocation response.

S5: MEPM transmits configuration request to MEC Platform 245.

S6: Once the MEP becomes aware that the application instance is running, application instance configuration information may be exchanged between the MEP and MEC application instance 260.

S7: MEP transmits configuration response to MEPM.

S8: MEPM transmits instantiate application response to MEO.

S9: MEO transmits instantiate application response to OSS.

Figure 4:
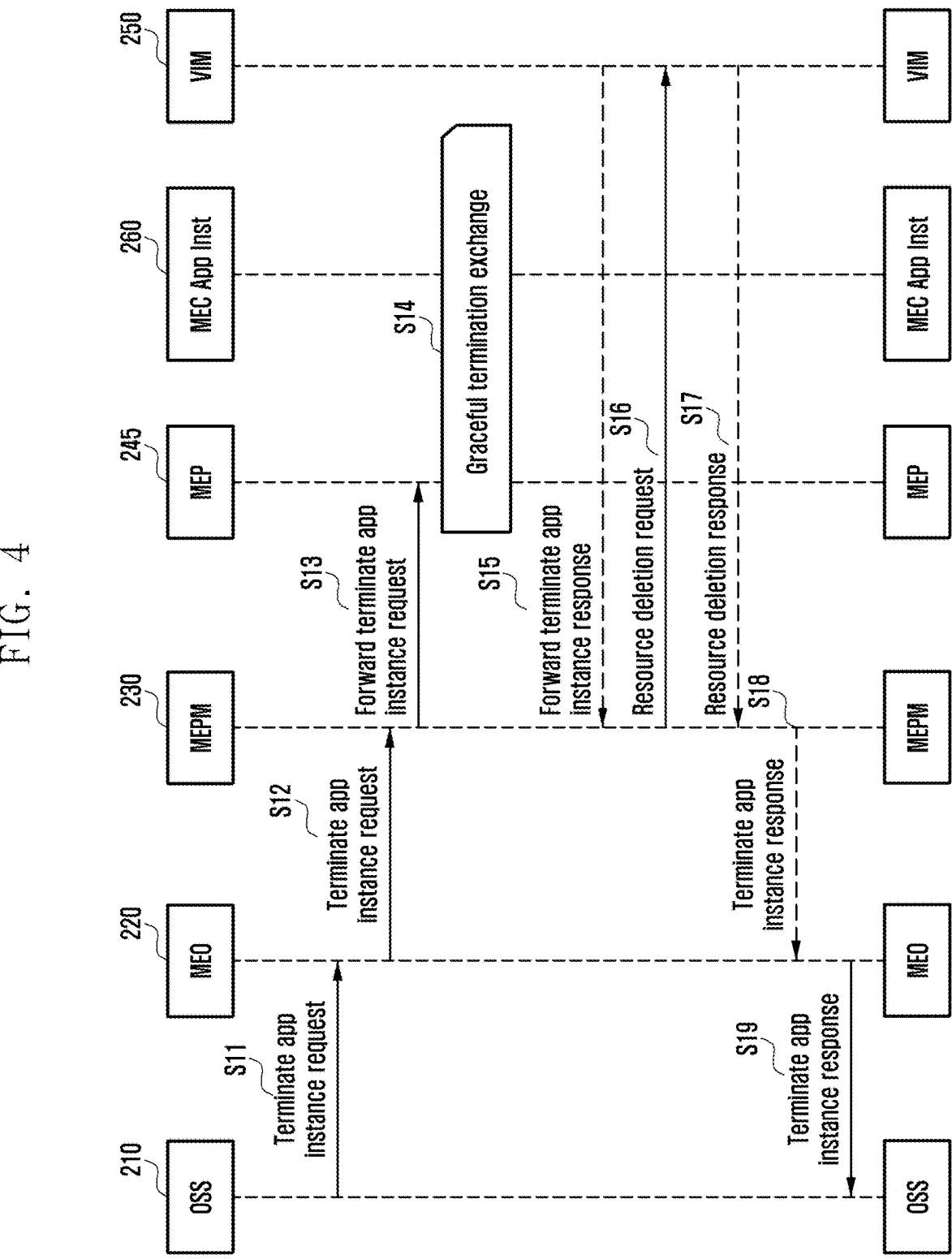
FIG. 4 illustrates an application termination flow according to an embodiment of the invention.

The signal flow for terminating an application instance is similar to that for instantiation, shown in FIG. 3, and is depicted in FIG. 4. However, as would be expected, termination results in additional resources being made available at the MEC host, rather than being consumed, as in the case of instantiation.

In FIG. 4, the signal flow is as follows:

S11: OSS 210 transmits terminate application instance request to MEO 220.

S12: MEO transmits terminate application instance request to MEPM 230.

S13: MEPM forwards terminate application instance request to MEP 250.

S14: The MEP may inform the application instance that it is to be terminated, in which case there are graceful application instance termination message exchanges between the MEP and MEC application instance.

S15: MEP forwards terminate application instance response to MEPM.

S16: MEPM transmits resource deletion request to VIM.

S17: VIM transmits resource deletion response to MPM.

S18: MEPM transmits terminate application instance response to MEO.

S19: MEO transmits terminate application instance response to OSS.

Figure 5:
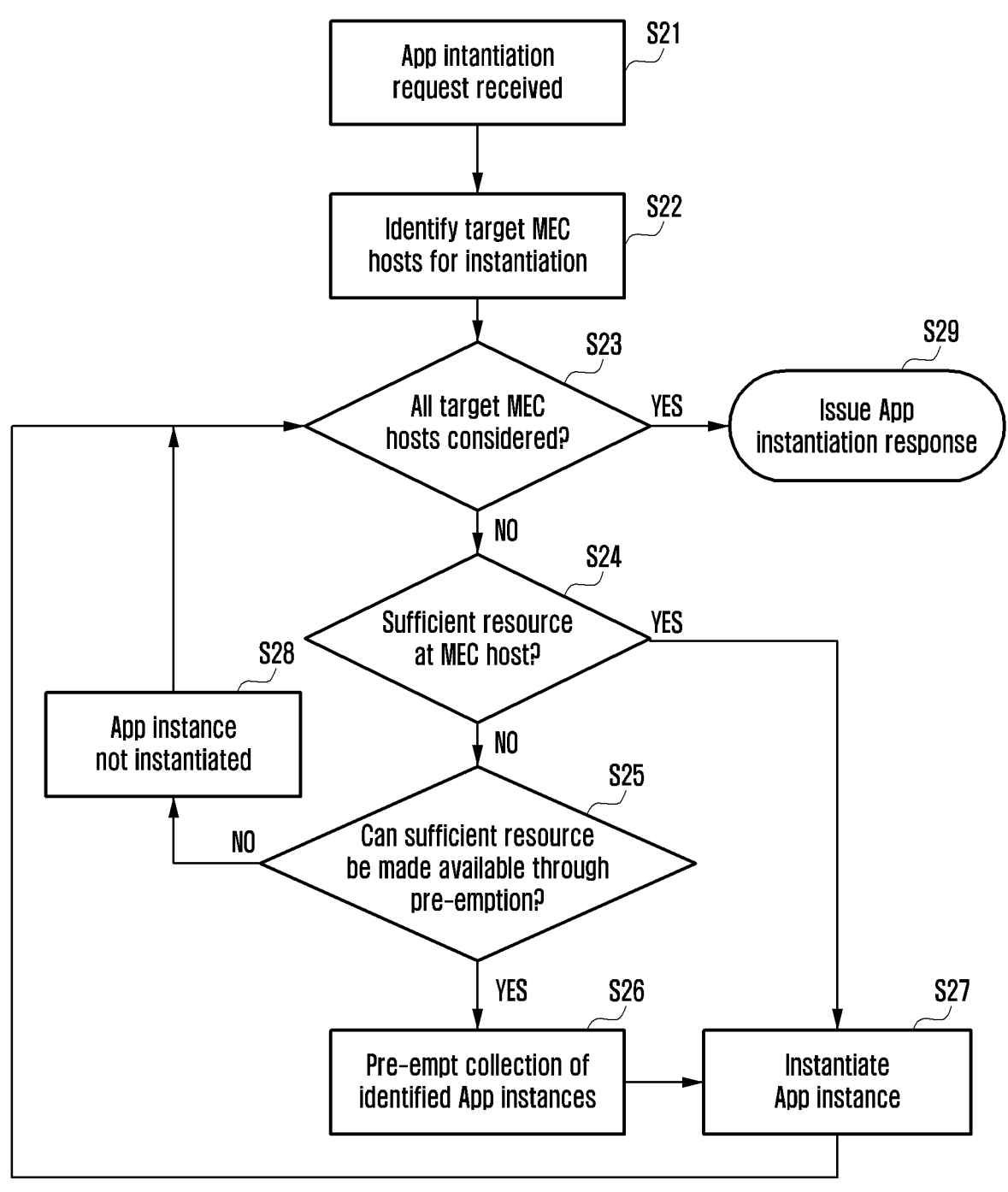
FIG. 5 illustrates a flowchart illustrating an embodiment of the invention.

Embodiments of the invention provide that additional pre-emption related information is sent in the application instantiation request sent by the OSS 210 to the MEO 220 to enable the MEO 220 to priorities between applications when processing the request. The result is that the MEO 220 may decide to pre-empt one or more existing application instances at an MEC host 240 in order to make additional resources available for the new application instantiation request. Therefore, after receiving a new instantiate application request from the OSS 210, the MEO 220 may issue one or more application instance pre-emption requests before transmitting the instantiate application request to a particular MEPM 230. The actions taken by the MEO 220 are depicted in FIG. 5 and described below.

S21: The flow is triggered as a result of the MEO receiving an application instantiation request from the OSS.

S22: The MEO then processes the application instantiation request and in doing so identifies the target MEC host or hosts for application instance placement. Such a decision may be made based on factors such as the services required by the application and any location constraints for its deployment.

S23: Each MEC host must be considered for application instance placement, since each host may have different resource availability. Once all identified MEC hosts have been considered the flow terminates at S29.

S24: Each MEC host will be checked for its resource availability. If there is sufficient resource move to step S27, otherwise move to step S25.

S25: If there isn't current sufficient resource at an MEC host to fulfil the application instantiation request, the MEO will assess, based on the information provided in the request, whether there is a collection of one of more existing application instances that can be pre-empted in order to make resource available (e.g. CPU, memory, storage) for instantiation of the new application instance. If a suitable application instance, or instances can be pre-empted move to step S26, otherwise move to step S28.

Note that if the resources consumed by the collection of application instances that a new application could pre-empt for a given MEC host is less than those required by an instance of the new application then pre-emption should be postponed until a time where sufficient resource may be made available. This is because there is little point pre-empting a collection of application instances if the new application instance may not be fulfilled.

S26: In this step pre-emption application procedures are initiated for each identified application instance necessary to be removed in order to make sufficient resources available for the new application instantiation request. Whether that is a terminate request or request to change the operational state of the application instance depends on the resource requirements of the application instantiation request being processed. The prior art ETSI MEC procedure for application termination is illustrated in FIG. 4, specifically steps S12 to S18. The procedure to change the operational state of an application instance is closely aligned to that of application termination, with terminate requests and responses being replaced with operate requests and responses.

S27: In this step the application instantiation procedures can now proceed. The prior art ETSI MEC procedure is illustrated in FIG. 3, specifically steps S2 to S8. Next move back to step S23.

S28: At this time, the application instantiation request cannot be fulfilled at the current MEC host, but the request may be reconsidered at a later time should the MEO become aware that the resource availability at the MEC host has changed. Next move back to step S23.

S29: Once the application instantiation request has been processed the response can be sent back to the OSS.

Note the OSS may be notified about each application instance that the MEO is not able to create. However, it may only be necessary to notify the OSS in cases that no application instance could be instantiated at all, since individual application instance placement decisions are considered to be the MEO's responsibility, with the OSS only informing the MEO that application instances should be made available. The same is true in case of an MEO initiated application instance pre-emption, whereby it may only be considered necessary to inform the OSS if the last instance of an application in the MEC system is pre-empted. In such a situation, the application would no longer be available for consumers. This may trigger the OSS to modify the pre-emption related attributes associated with the application to ensure that instances will be created by the MEO.

Figure 6:
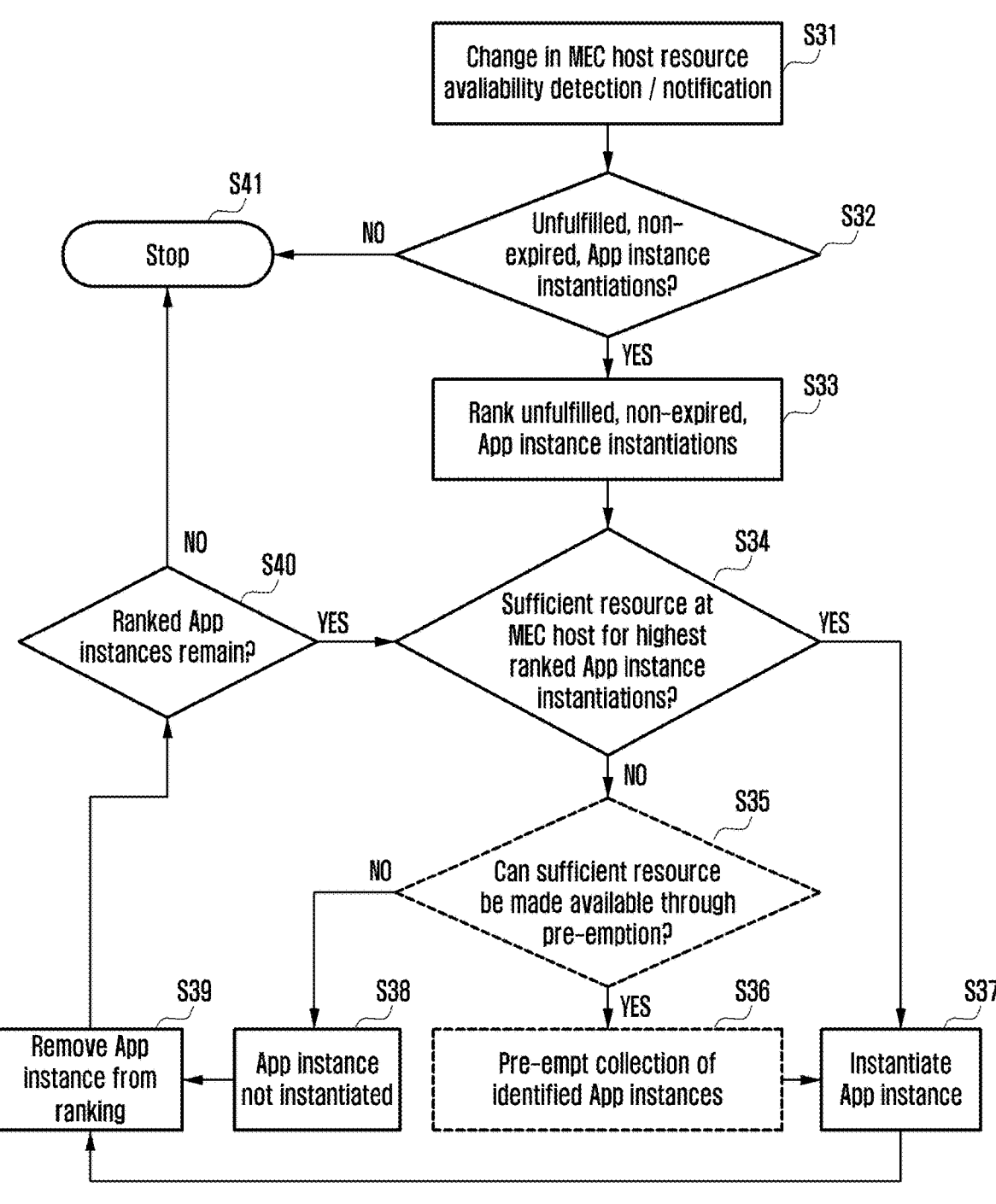
FIG. 6 illustrates a flowchart illustrating a further embodiment of the invention.

Should the MEO become aware that MEC host resource availability has changed (e.g. through the removal of an application instance, or if previous unavailable resources becoming available once more), application instantiation requests that could not previously be fulfilled may be reconsidered by the MEO, assuming that any request expiry time has not been exceeded. The actions taken by the MEO in this situation are illustrated in FIG. 6 and described below.

S31: The flow is triggered as a result of the MEO becoming aware of a change in resource availability at a MEC host.

S32: The MEO then determines whether there are any application instantiation requests that could not be fulfilled and have not expired for this MEC host. If there are not then move to step S41, otherwise move to step S33.

S33: The MEO then creates, assuming it is not already available, a ranked list of unfulfilled application instantiation requests for this MEC host. The ranking is based on the information provided in the original instantiation request for the application.

S34: In this step the MEC host will be assessed for its resource availability for the application with the highest ranking in the ranked list. If there is sufficient resource move to step S37, otherwise move to step S35.

S35: If there isn't current sufficient resource at an MEC host to fulfil the application instantiation request, the MEO will assess, based on the information provided in the original request, whether there is a collection of one of more existing application instances that can be pre-empted in order to make resource available for instantiation of the new application instance. If a suitable application instance, or instances can be pre-empted move to step S36, otherwise move to step S39.

Note that it is less likely the application instance being considered would be able to pre-empt an existing application instance as a result of increased resource availability at a MEC host in the case that an application instance has been pre-empted. This is because such pre-emption would have taken place at the time of the initial instantiation request. Hence the dotted line for steps S35 & S36.

S36: In this step application pre-emption procedures are initiated for each identified application instance necessary to be pre-empted in order to make sufficient resources available for the new application instantiation request. The prior art ETSI MEC procedure for application instance termination is illustrated in FIG. 4, specifically steps S12 to S18.

S37: In this step the application instantiation procedures can now proceed. The prior art ETSI MEC procedure is illustrated in FIG. 3, specifically steps S2 to S8. Next move to step S39.

S38: At this time, the application instantiation request cannot be fulfilled at the current MEC host, but the request may be reconsidered at a later time should the MEO become aware that the resource availability at the MEC host has changed. Next move to step S39.

S39: The application instance has now been considered and is therefore taken off the current ranked list.

S40: If ranked application instances remain on the list, consider the next application instance by moving to step S34. Otherwise, move to step S41.

S41: All ranked application instances have now been considered and the process stops.

The additional information sent in the application instantiate request is highlighted in [Table 1], below, which shows, specifically, a new preemptionInfo attribute. The other attributes are already present in the current version of the ETSI specifications.

In an alternative embodiment, the preemptionInfo may be included as part of the application descriptor (AppD). However, the descriptor is considered less dynamic in nature, i.e. it is specified once and not updated thereafter. However, it may be advantageous to include it both in the application descriptor and the application instantiate request as is the case for the virtualComputeDescriptor and virtualStor-age-Descriptor, in which case, NOTE 1 would apply.

TABLE 1

| Attribute name | Cardinality | Data type | Description |
|---|---|---|---|
| virtualComputeDescriptor | 0 . . . 1 | VirtualComputeDescription | Describes CPU, Memory and acceleration requirements of the virtual machine for the application instance to be created. See note 1. |
| virtualStorageDescriptor | 0 . . . N | VirtualStorageDescriptor | Defines descriptors of virtual storage resources to be used by the application instance to be created. See note 1. |
| selectedMECHostInfo | 1 . . . N | MECHostInformation | Describes the information of selected host for the application instance. See note 2. |
| locationConstraints | 0 . . . 1 | LocationConstraints | Defines the location constraints for the application instance to be created. See note 3. |
| vimConnectionInfo | 0 . . . N | VimConnectionInfo | Information about VIM connections to be used for managing the resources for the application instance, or refer to external/externally-managed virtual links. This attribute shall only be supported and may be present if application-related resource management in direct mode is applicable. See note 2. |
| preemptioninfo | 0 . . . 1 | Preemptioninfo | Provides information to guide application instance pre-emption decisions should resources (e.g. CPU, Memory, etc.) need to be made available in order to fulfil the instantiate request. See note 3. |

NOTE 1:
This attribute may be provided in the InstantiateAppRequest structure to override the same attribute in the AppD.
NOTE 2:
This field applies to Mm3 reference point only.
NOTE 3:
This field applies to Mml reference point only.

The PreemptionInfo data type identifies the applications that either can, or cannot, be considered for pre-emption in order to fulfil an application instantiation request, see [Table 2], below, for further information.

TABLE 2

| Attribute name | Data type | Cardinality | Description |
|---|---|---|---|
| protect | Boolean | 1 | Indicates that the listed applications shall not be pre-empted (TRUE), or are available for pre-emption (FALSE). |
| appDIds | array (String) | 0 . . . N | List of MEC application descriptor identifiers. |
| appNames | array (String) | 0 . . . N | List of MEC application names. |
| appProviders | array (String) | 0 . . . N | List of MEC application providers. |
| appServices | array (ServiceDescriptor) | 0 . . . N | List of services produced by MEC applications. Only serName and version |

TABLE 2-continued

| Attribute name | Data type | Cardinality | Description |
|---|---|---|---|
| | | | attributes of the ServiceDescriptor data type shall be present. |

Various structures may be used for the PreemptionInfo data type to convey equivalent information, for example [Table 3], shown below, gives alternative attributes for PreemptionInfo. In addition, further attributes may be added, if required. For instance, attributes relating to an application's requested resource requirements, e.g. CPU, memory and storage, or the requested key performance indicators (KPIs), e.g. latency and throughput. With such attributes, applications may be identified for pre-emption (or, conversely, protected from pre-emption) based on the amount of resource they require or the strictness of the target KPIs.

TABLE 3

| Attribute name | Data type | Cardinality | Description |
|---|---|---|---|
| apps | array (Structure (inlined)) | 0 . . . N | Array of applications. See note. |
| >appDId | String | 0 . . . 1 | MEC application descriptor identifier. |
| >appName | String | 0 . . . 1 | MEC application name. |
| >appProvider | String | 0 . . . 1 | MEC application provider. |
| >protect | Boolean | 1 | Indicates the identified application shall not be pre-empted (TRUE), or is available for pre-emption (FALSE). |
| appServices | array (Structure (inlined)) | 0 . . . N | Array of services. |
| >service | ServiceDescriptor | 1 | Only serName and version of the ServiceDescriptor data type shall be present. |
| >protect | Boolean | 1 | Indicates the identified service shall not be pre-empted (TRUE), or is available for preemption (FALSE). |

NOTE:
If the apps attribute is present, then at least one of appDId, appName or appProvider shall be present Note that the ServiceDescriptor data type shown above is already defined in the prior art ETSI MEC specifications. See [Table 4] below.

The Pre-emption-Vulnerability defines whether a service data flow can lose the resources assigned to it in order to admit a service data flow with higher priority level.

TABLE 4

| Attribute name | Data type | Cardinality | Description |
|---|---|---|---|
| serName | 1 | String | The name of the service, for example, RNIS, LocationService, etc. |
| serCategory | 0 . . . 1 | CategoryRef | A Category reference of the service, defined in ETSI GS MEC OIL |
| version | 1 | String | The version of the service. |
| transportsSupported | 0 . . . N | Structure (inlined) | Indicates transports and serialization formats supported made available to the service-consuming application. Defaults to REST + JSON if absent. |
| >transport | 1 | TransportDescriptor | Information about the transport in this binding. |
| >serializers | 1 . . . N | SerializerTypes | Information about the serializers in this binding, as defined in the SerializerTypes type in ETSI GS MEC 011. |

Within the 3GPP specifications, priority levels can be assigned to different access bearers in order to support a differential quality of service (QoS) between certain connections. For example, 3GPP TS 23.060 "General Packet Radio Service (GPRS); Service description; Stage 2" defines Priority-Level, Pre-emption-Capability and Pre-emption-Vulnerability. The Priority-Level is used for deciding whether a bearer establishment or modification request can be accepted or needs to be rejected in case of resource limitations. It can also be used to decide which existing bearers to pre-empt during resource limitations. The priority level defines the relative importance of a resource request. Values 1 to 15 are defined, with value 1 as the highest level of priority. The values are typically assigned according to traffic classes, e.g. voice, video, signalling and best effort. Therefore it is not straightforward to use priority to differentiate between requests within the same traffic class. Also since priority is statically assigned it is difficult to account for changes in the ranking between traffic over time.

The Pre-emption-Capability defines whether a service data flow can get resources that were already assigned to another service data flow with a lower priority level.

Such an approach may be beneficial in the context of MEC, however the approach is deemed insufficient (as compared to this invention) in providing a method to describe the potentially complex, and dynamic nature of the, relationships between different MEC applications and services. For instance, in an MEC system there may be many games offered, which in turn are offered by many game providers and, therefore, an approach is required to allow the relationships between them to be easily described. This is especially so, given the number of parties involved (including application providers, the edge service providers and the MNOs) and the different business relationships between them.

Another situation in which pre-emption can play a part is in a situation where two applications may not run concurrently. In such a scenario, a pre-instantiated application may be pre-empted if a later attempt is made to instantiate a different application which is identified as being somehow incompatible with the first application. If the second application has a higher priority (or some other means of identifying the conflict), then the first application is pre-empted.

Note that this scenario does not take account of resource availability and is related to incompatibility.

Embodiments of the invention offer a mechanism to provide the orchestrator of an MEC system with information pertinent to application lifecycle management decisions in situations where the target edge application host environment is resource constrained.

Specifically, an embodiment of the invention provides a mechanism which enables the orchestrator to select whether and which existing application instances should be pre-empted in order to fulfil a new application instantiation request, in the event that there are insufficient resources within the edge host environment to perform the instantiation. The mechanism provides the flexibility to identify specific applications or groups of applications that are either candidates for pre-emption or protected from pre-emption with each new application instantiation request. This allows for complex business arrangements to be accounted for, which is particularly important in a MEC system where application providers, the edge service provider and the communications provider could all be separate independent entities and the relationship between them may be dynamic in nature, where for instance it may be critical that certain applications or services are available at specific times.

Figure 7:
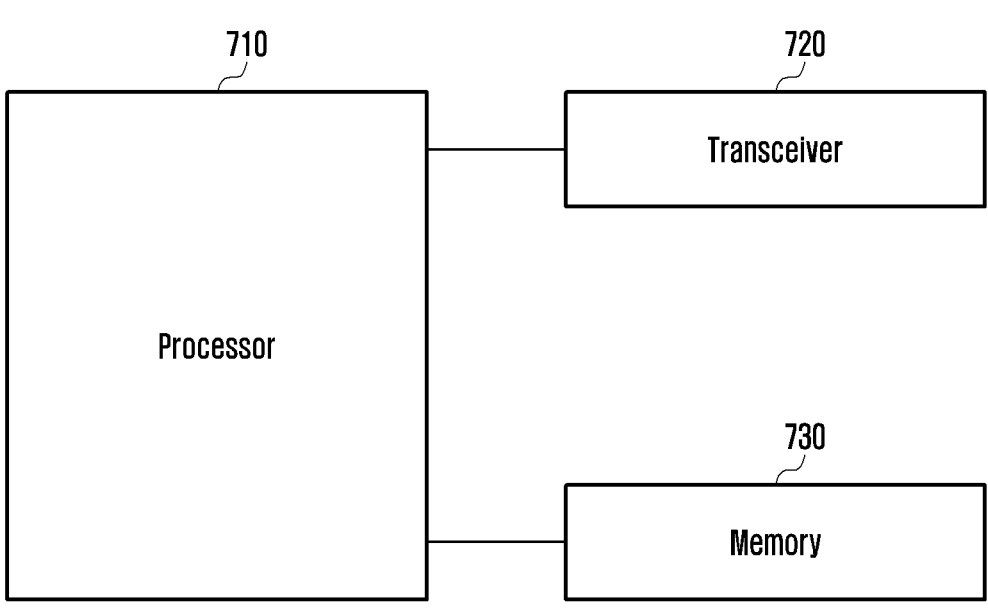
FIG. 7 illustrates a block diagram of an entity according to embodiments of the present disclosure.

FIG. 7 illustrates a block diagram of an entity according to embodiments of the present disclosure.

Referring to the FIG. 7, the entity 700 may include a processor 710, a transceiver 720 and a memory 730. However, all of the illustrated components are not essential.

The entity 700 may be implemented by more or less components than those illustrated in FIG. 7. In addition, the processor 710 and the transceiver 720 and the memory 730 may be implemented as a single chip according to another embodiment.

The aforementioned components will now be described in detail.

The processor 710 may include one or more processors or other processing devices that control the proposed function, process, and/or method. Operation of the entity 700 may be implemented by the processor 710.

In one embodiment, the processor 710 may map PRS to Resource Elements (REs) of a frame structure and transmit the frame structure such that the power used to transmit REs containing PRS is higher than the power used to transmit REs not containing PRS.

The transceiver 720 may include a RF transmitter for up-converting and amplifying a transmitted signal, and a RF receiver for down-converting a frequency of a received signal. However, according to another embodiment, the transceiver 720 may be implemented by more or less components than those illustrated in components.

The transceiver 700 may be connected to the processor 710 and transmit and/or receive a signal. The signal may include control information and data. In addition, the transceiver 720 may receive the signal through a wireless channel and output the signal to the processor 710. The transceiver 720 may transmit a signal output from the processor 710 through the wireless channel.

The memory 730 may store the control information or the data included in a signal obtained by the entity 700. The memory 730 may be connected to the processor 710 and store at least one instruction or a protocol or a parameter for the proposed function, process, and/or method. The memory 730 may include read-only memory (ROM) and/or random access memory (RAM) and/or hard disk and/or CD-ROM and/or DVD and/or other storage devices.

Figure 8:
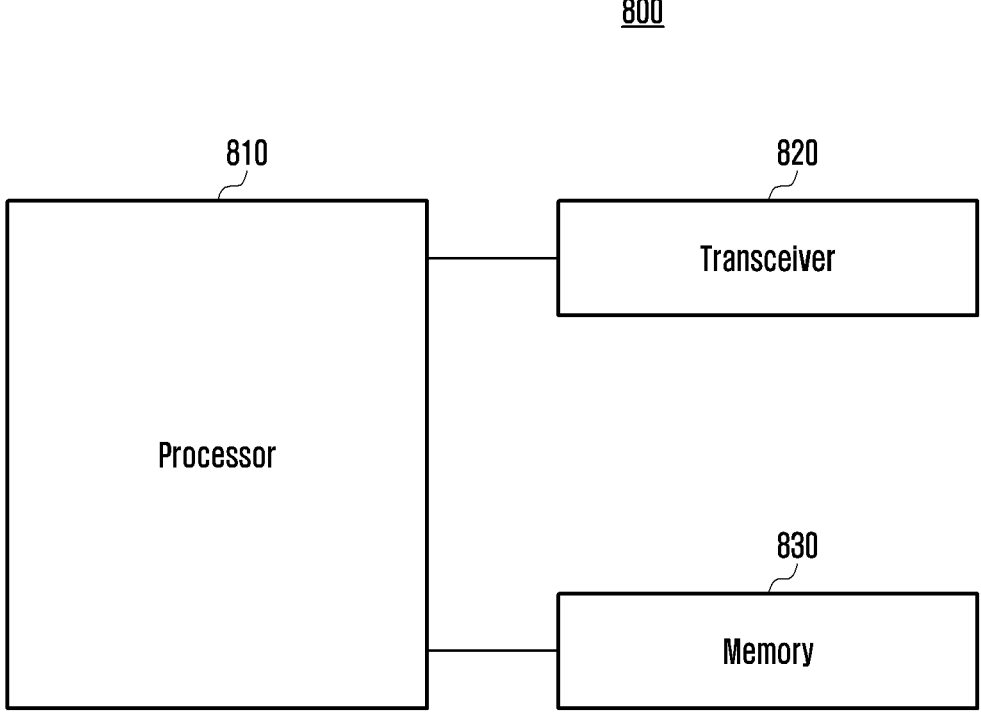
FIG. 8 illustrates a user equipment (UE) according to embodiments of the present disclosure.

FIG. 8 illustrates a user equipment (UE) according to embodiments of the present disclosure.

Referring to the FIG. 8, the UE 800 may include a processor 810, a transceiver 820 and a memory 830. However, all of the illustrated components are not essential. The UE 800 may be implemented by more or less components than those illustrated in FIG. 8. In addition, the processor 810 and the transceiver 820 and the memory 830 may be implemented as a single chip according to another embodiment.

The aforementioned components will now be described in detail.

The processor 810 may include one or more processors or other processing devices that control the proposed function, process, and/or method. Operation of the UE 800 may be implemented by the processor 810.

In one embodiment, the processor 810 may measure the signal strength from one or more base stations and transmit PRS with a power determined based on the measurements.

In one embodiment, the processor 810 may receive signaling from a base station and transmit PRS with a power determined based on the signaling.

The transceiver 820 may include a RF transmitter for up-converting and amplifying a transmitted signal, and a RF receiver for down-converting a frequency of a received signal. However, according to another embodiment, the transceiver 820 may be implemented by more or less components than those illustrated in components.

The transceiver 820 may be connected to the processor 810 and transmit and/or receive a signal. The signal may include control information and data. In addition, the transceiver 820 may receive the signal through a wireless channel and output the signal to the processor 810. The transceiver 820 may transmit a signal output from the processor 810 through the wireless channel.

The memory 830 may store the control information or the data included in a signal obtained by the UE 800. The memory 830 may be connected to the processor 810 and store at least one instruction or a protocol or a parameter for the proposed function, process, and/or method. The memory 830 may include read-only memory (ROM) and/or random access memory (RAM) and/or hard disk and/or CD-ROM and/or DVD and/or other storage devices.

Certain examples of the present disclosure may be provided in the form of a base station (e.g. gNB) and/or method therefore. Certain examples of the present disclosure may be provided in the form of a mobile device (e.g. UE) and/or method therefore. Certain examples of the present disclosure may be provided in the form of a system comprising one or more base stations and one or more mobile devices, and/or method therefore.

The embodiments described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

The skilled person will appreciate that a given process, operation and/or method step disclosed herein may be performed by a single entity (hardware and/or software), or the performance of such a process, operation and/or method step may be distributed and performed by two or more entities in cooperation. The skilled person will also appreciate that a single entity (hardware and/or software) may be configured to perform one process, operation and/or method step disclosed herein, or may be configured to perform two or more such processes, operations and/or method steps.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

The above flowcharts and flow diagrams illustrate examples of methods and processes that can be implemented in accordance with the principles of the present disclosure and various changes could be made to the methods and processes illustrated in the flowcharts and flow diagrams. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by an operational support system (OSS) in a multi-access edge computing (MEC) system, the method comprising:

transmitting, to an MEC orchestrator (MEO), an application instantiation request message for instantiating a first application, wherein the application instantiation request message includes pre-emption information concerning the first application, wherein the pre-emption information is used to pre-empt the first application in the future, if required;

transmitting, to the MEO, an application instantiation request message for instantiating a second application; and receiving, from the MEO, an application instantiation response message, wherein pre-emption of the first application is decided by the MEO in response to the application instantiation request message for instantiating the second application, in case that available resources for the second application are insufficient in the MEC system, or in case that the presence of an application conflict associated with the first application and the second application is identified, wherein the application conflict prohibits the first application and the second application running concurrently.

2. The method of claim 1, wherein the pre-emption information includes at least one of resource requirements, key performance indicators (KPIs), a priority level, a preemption-capability, or a pre-emption-vulnerability associated with the first application.

3. The method of claim 1, wherein the pre-emption of the first application comprises either a change in an operational state of the first application or the removal of the first application.

4. The method of claim 1, wherein the application instantiation request message for the first application includes information on expiry time of the first application.

5. A method performed by a multi-access edge computing (MEC) orchestrator (MEO) in an MEC system, the method comprising:

receiving, from an operational support system (OSS), an application instantiation request message for instantiating a first application, wherein the first application instantiation request message includes pre-emption information concerning the first application, wherein the pre-emption information is used to pre-empt the first application in the future, if required;

transmitting, to a target host, the application instantiation request message for instantiating the first application;

receiving, from the OSS, an application instantiation request message for instantiating a second application; and deciding to pre-empt the first application in response to the application instantiation request message for instantiating the second application, in case that available resources for the second application are insufficient in the MEC system, or in case that a presence of an application conflict associated with the first application and the second application is identified; and, transmitting, to the target host, the application instantiation request message for instantiating the second application;

wherein the application conflict prohibits the first application and the second application running concurrently.

6. The method of claim 5, wherein the application instantiation request message for the first application include information on expiry time.

7. The method of claim 5, wherein the pre-emption information includes at least one of resource requirements, key performance indicators (KPIs), a priority level, a pre-emption-capability, or a pre-emption-vulnerability associated with the first application.

8. A method performed by a target host in a multi-access edge computing (MEC) system, the method comprising:

receiving, from an MEC orchestrator (MEO), an application instantiation request message for a first application, wherein the application instantiation request message includes pre-emption information concerning the first application, wherein the pre-emption information is used to pre-empt the first application in the future, if required;

receiving, from the OSS, an application instantiation request message for instantiating a second application; and deciding for the pre-emption of the first application in response to the application instantiation request message for instantiating the second application, in case that available resources for the second application are insufficient in the MEC system, or in case that a presence of an application conflict associated with the first application is identified, wherein the application conflict prohibits a first application and a second application running concurrently.

9. The method of claim 8, the method further comprising:

assessing whether the application conflict is resolved by pre-empting the first application in case that the presence of the application conflict is identified.

10. The method of claim 8, the method further comprising:

assessing resource availability; and assessing whether the resource availability could be available by pre-empting the first application in case that the resource availability is assessed insufficiently.

11. The method of claim 10, the method further comprising:

transmitting, to the second entity, an application instantiation response message, in case that the resource availability is available by pre-empting the first application.

12. The method of claim 8, wherein the application instantiation request message for the first application includes information on expiry time of the first application.

13. The method of claim 12, the method further comprising:

re-assessing whether the application conflict is resolved by pre-empting the first application, in case that the expiry time has not elapsed.

14. The method of claim 8, wherein the pre-emption information includes at least one of resource requirements, key performance indicators (KPIs), a priority level, a pre-emption-capability, or a pre-emption-vulnerability associated with the first application.

* * * * *